United States Patent
Byun

(10) Patent No.: US 12,066,928 B2
(45) Date of Patent: Aug. 20, 2024

(54) MEMORY SYSTEM, MEMORY CONTROLLER AND OPERATION METHOD THEREOF

(71) Applicant: SK hynix Inc., Icheon-si (KR)

(72) Inventor: Eu Joon Byun, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 40 days.

(21) Appl. No.: 18/151,320

(22) Filed: Jan. 6, 2023

(65) Prior Publication Data

US 2024/0020224 A1 Jan. 18, 2024

(30) Foreign Application Priority Data

Jul. 13, 2022 (KR) .................. 10-2022-0086114

(51) Int. Cl.
*G06F 12/00* (2006.01)
*G06F 12/02* (2006.01)
*G06F 13/16* (2006.01)

(52) U.S. Cl.
CPC ...... *G06F 12/0238* (2013.01); *G06F 13/1673* (2013.01); *G06F 2212/7201* (2013.01)

(58) Field of Classification Search
CPC ...... G06F 12/0238; G06F 12/10; G06F 12/14; G06F 13/1673; G06F 2212/7201
See application file for complete search history.

(56) References Cited

U.S. PATENT DOCUMENTS 11,366,733 B2 * 6/2022 Kim ............... G06F 12/0246
11,487,653 B2 * 11/2022 Luo ............... G06F 12/1054

\* cited by examiner

*Primary Examiner* — Shawn X Gu
(74) *Attorney, Agent, or Firm* — Perkins Coie LLP

(57) ABSTRACT

A memory system that includes a system protection function implemented by using a double-map scheme, a memory controller, and operation methods thereof are disclosed. The memory system includes a memory device and a memory controller. The memory device includes a plurality of non-volatile memory cells corresponding to a plurality of physical addresses respectively. The memory controller controls the memory device and uses a first map and a second map. The first map includes physical address mapping information based on a logical address for a physical address where first-type data is stored. The second map includes physical address mapping information based on a logical address for a physical address where second-type data is stored.

14 Claims, 5 Drawing Sheets

MEMORY SYSTEM, MEMORY CONTROLLER AND OPERATION METHOD THEREOF

PRIORITY CLAIM AND CROSS-REFERENCE TO RELATED APPLICATIONS

This patent document claims the priority and benefits of Korea Patent Application No. 10-2022-0086114, filed on Jul. 13, 2022, which is incorporated by reference in its entirety as part of the disclosure of this patent document.

TECHNICAL FIELD

Various embodiments relate to a memory system, a memory controller, and operation methods thereof.

BACKGROUND

With the recent increase in the use of light-weight, small-size portable electronic devices such as mobile phones, tablet PCs, and laptops, the demand for semiconductor-based data storage systems such as non-volatile memory systems has been increasing. Semiconductor-based data storage devices provide advantages over the traditional hard disk drives since semiconductor memory devices have no mechanical components such as driving part, and thus offer excellent stability and durability, has high data access rate and low power consumption.

A non-volatile memory system may include a memory controller for controlling a memory. The memory controller may receive a command from a host and may perform memory operations such as writing data to a memory, reading data from a memory, or erasing a memory, etc., in accordance with the received command.

The non-volatile memory system may further include a separate volatile memory for temporarily storing data to be written to a non-volatile memory or data to be read from the non-volatile memory.

The volatile memory may maintain the stored data only when power is supplied and may lose the stored data when the power supply is disconnected. The non-volatile memory may not lose the stored data even though the power supply is disconnected.

A system may have an administrator account (administrator mode) and a user account (user mode), which is different from the administrator account, in order to restrict unauthorized users from accessing certain data or a certain area (e.g., memory area) that may cause system errors. While the administrator account can access the entire memory area, the user account can only access a certain memory area that is allowed to be accessed.

A system that has different access levels may limit usability in the user account and make it difficult to utilize the entire system. However, such a basic access prohibition can protect the system.

SUMMARY

Generally, only software of a system supports a system protection function based on the access prohibition and a non-volatile memory system itself does not. Therefore, it is not easy to implement the system protection function in the non-volatile memory system.

In order to address the above-described problems, the disclosed technology can be implemented in some embodiments to provide a memory system that provides a protection area and a non-protection area.

In addition, the disclosed technology can be implemented in some embodiments to provide an operation method of a memory controller of the memory system capable of providing the protection area and the non-protection area.

The technical problem to be overcome by the technology disclosed in this patent document is not limited to the above-mentioned technical problems, and other technical problems can also be addressed by embodiments of the disclosed technology.

In some embodiments of the disclosed technology, a memory controller includes a first interface in communication with a first external device to perform data communication between the memory controller and the first external device; a second interface in communication with a second external device to transmit, to the second external device, a signal for controlling an operation of the second external device; a buffer configured to store: a first map comprising mapping information between a logical address of the first external device for storing first data which is a first type data and a physical address of the second external device where the first data is stored; and a second map comprising mapping information between a logical address of the first external device for storing second data which is a second-type data and a physical address of the second external device where the second data is stored; and a processor configured to update the first map and the second map based on a control signal received from the first external device, and store the first map in the second external device. The first map maintains the mapping information even after a reset operation is performed. The second map loses the mapping information after the reset operation is performed.

In some embodiments of the disclosed technology, an operation method of a memory controller includes: receiving, from a first external device, a write request comprising a first logical address, a write data, and a write mode indicating whether the write data is a first-type data or a second-type data; determining a first physical address of a second external device, to which the write data is to be written; and writing mapping information between the first logical address and the first physical address to a first map or a second map, based on the write mode, wherein the first map comprises mapping information between a logical address of the first external device and a logical address of the first external device for storing first data which is a first-type data and a physical address of the second external device where the first-type data is stored and a logical address of the first external device corresponding to the physical address of the second external device where the first-type data is stored and the physical address, and maintains the mapping information even after a reset operation is performed. The second map comprises mapping information between a logical address of the first external device and a logical address of the first external device for storing second data which is a second-type data and a physical address of the second external device where the second-type data is stored and a logical address of the first external device corresponding to the physical address of the second external device where the second-type data is stored and the physical address, and loses the mapping information after the reset operation is performed.

In some embodiments of the disclosed technology, a memory system includes a nonvolatile memory and configured to store data in the nonvolatile memory; and a memory controller configured to generate a control signal for controlling the memory device, write data to the memory device and read data from the memory device. The memory controller comprises: a first interface in communication with a first external device to perform data communication between the memory controller and the first external device; a second interface in communication with a second external device to transmit, to the second external device, a signal for controlling an operation of the second external device; a buffer configured to store a first map comprising mapping information between a logical address of the first external device for storing first data which is a first-type data and a physical address of the second external device where the first data is stored and a second map comprising mapping information between a logical address of the first external device for storing second data which is a second-type data and a physical address of the second external device where the second data is stored; and a processor configured to update the first map and the second map based on a control signal received from the first external device, and periodically store the first map in the memory device. The first map maintains the mapping information even after a reset operation is performed. The second map loses the mapping information after the reset operation is performed.

In some embodiments of the disclosed technology, a memory controller includes a first interface configured to perform data communication with a first external device; a second interface configured to generate a signal for controlling an operation of a second external device and transmits the signal; a buffer configured to store a first map including mapping information between a logical address of the first external device and a physical address of the second external device where a first type data is stored and a second map including mapping information between a logical address of the first external device and a physical address of the second external device where a second type data is stored and the physical address; and a processor configured to update the first map and the second map based on a control signal received from the first external device, and controls the first map to be periodically stored in the second external device. The first map maintains the mapping information even after reset is performed. The second map loses the mapping information after the reset is performed.

In some embodiments of the disclosed technology, an operation method of a memory controller includes: includes: receiving, from a first external device, a write request including a first logical address, a write data, and a write mode indicating whether the write data is a first type data or a second type data; determining a first physical address of a second external device, to which the write data is to be written; and writing mapping information between the first logical address and the physical address to a first map or a second map, based on the write mode. The first map includes mapping information between a logical address of the first external device and a physical address of a storage device of the second external device where the first type data is stored, and maintains the mapping information even after reset is performed. The second map includes mapping information between a logical address of the first external device and a physical address of the second external device where the second type data is stored, and loses the mapping information after the reset is performed.

In some embodiments of the disclosed technology, a memory system includes a memory device composed of a nonvolatile memory and configured to store data; and a memory controller configured to generate a control signal for controlling the memory device, and write data to the memory device or read data from the memory device. The memory controller includes: a first interface configured to perform data communication with a first external device; a second interface configured to generate a signal for controlling an operation of the memory device and transmit the signal; a buffer configured to store a first map including mapping information between a logical address of the first external device and a physical address of the memory device where a first type data is stored and a second map including mapping information between a logical address of the first external device and a physical address of the memory device where a second type data is stored; and a processor configured to update the first map and the second map based on a control signal received from the first external device, and control the first map to be periodically stored in the memory device. The first map maintains the mapping information even after reset is performed. The second map loses the mapping information after the reset is performed.

DETAILED DESCRIPTION

Features and certain advantages in connection with specific implementations of the disclosed technology disclosed in this patent document are described by example embodiments with reference to the accompanying drawings.

The Disclosed Technology

A non-volatile memory system may include one or more memory devices for storing data and one or more memory controllers for controlling the one or more memory devices. A memory controller may receive a command from a host and may write data to a memory, read data from a memory, or erase a memory based on the received command.

The non-volatile memory system may further include a separate memory device (e.g., volatile memory device) for temporarily storing data to be written to a non-volatile memory in the non-volatile memory system or data to be read from the non-volatile memory.

Such a volatile memory device can retain the stored data only when power is supplied and may lose the stored data when the power supply is disconnected. In contrast, the non-volatile memory can retain the stored data even after the power supply is disconnected.

In some implementations, an electronic system may have an administrator account (administrator mode) and a user account (user mode), which is different from the administrator account, in order to restrict unauthorized users from accessing certain data or a certain area (e.g., memory area) that may cause system errors. While the administrator account can access the entire memory area, the user account can only access a certain memory area that is allowed to be accessed.

In some implementations, an electronic system that has different access levels may limit usability in the user account and make it difficult to utilize the entire system. However, such a basic access prohibition can protect the electronic system.

Figure 1:
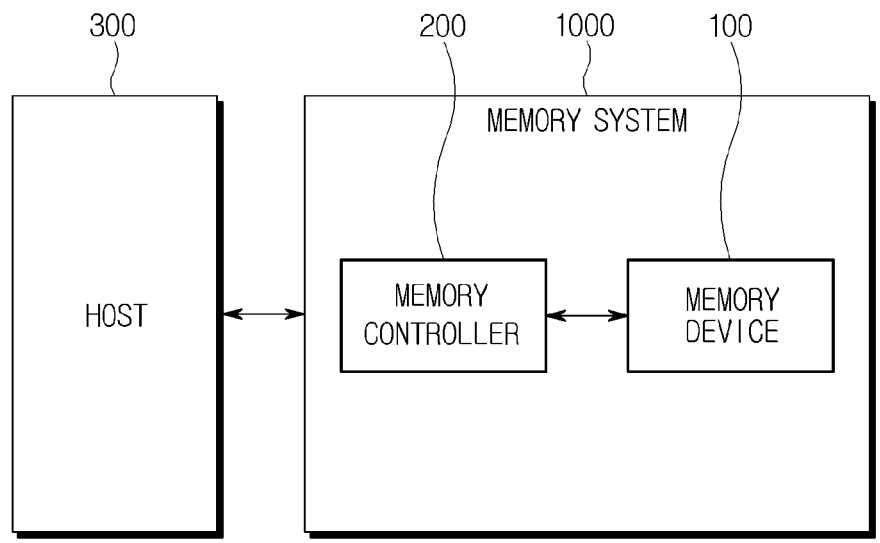
FIG. 1 shows an example of a memory system based on some embodiments of the disclosed technology.

FIG. 1 shows an example of a memory system 1000 based on some embodiments of the disclosed technology.

Referring to FIG. 1, the memory system 1000 may include a memory device 100 and a memory controller 200 that controls the operation of the memory device. The memory system 1000 stores data in accordance with the control of a host 300 such as a mobile phone, a smart phone, an MP3 player, a laptop computer, a desktop computer, a game machine, a TV, a tablet PC, or an in-vehicle infotainment (IVI) system, etc.

The memory system 1000 may be divided into various types according to a host interface method used for communication with the host 300, a configuration of the memory system, and the like. For example, the memory system 1000 may be divided into various types such as a solid-state drive (SSD), a multimedia card (MMC), an embedded multimedia card (eMMC), an RS-MMC, a micro-MMC, secure digital (SD), mini-SD, micro-SD, a universal storage bus (USB), a universal flash storage (UFS), a personal computer memory card international association (PCMCIA), peripheral component interconnection (PCI), PCI express (PCI-E), compact flash (CF), smart media, a memory stick, etc.

The memory device 100 is a physical device for storing data, and may include a NAND flash memory, a vertical NAND flash memory, a NOR flash memory, and a resistive random-access memory (RRAM), a phase-change memory (PRAM), a magnetoresistive random-access memory (MRAM), a ferroelectric random-access memory (FRAM), a spin transfer torque random access memory (STT-RAM) and the like. In this specification, for convenience of description, it is assumed that the memory device 100 is a NAND flash memory.

The memory device 100 may operate in response to the control of the memory controller 200 and may include a plurality of memory cells capable of storing data.

A memory cell may store one data bit, two data bits, three data bits, or four data bits depending on its structure.

The plurality of memory cells may be gathered to form one page. In some embodiments of the disclosed technology, the page may indicate a minimum unit used to write data to the memory device 100 or to read data from the memory device 100.

A memory block has a concept including a plurality of pages, and may be used as a minimum unit when data is erased from the memory device 100.

The memory cell array may be a concept including a plurality of memory blocks.

The memory device 100 is configured to receive a command and an address from the memory controller 200 and to access a region selected by the address in the memory cell array. That is, the memory device 100 may perform an operation directed by the command with respect to the region selected by the address. For example, the memory device 100 may perform a write operation (program operation), a read operation, and an erase operation. During the write operation, the memory device 100 may store (program) data in the region selected by the address. During the read operation, the memory device 100 may read the data from the region selected by the address. During the erase operation, the memory device 100 may erase the data stored in the region selected by the address.

The memory device 100 may store a logical to physical (L2P) map. The L2P map may include mapping information between a logical address recognized as storing data by the host 300 and a physical address of the memory device 100 in which the corresponding data is actually stored.

The memory controller 200 may control the overall operation of the memory system 1000.

When power is applied to the memory system 1000, the memory controller 200 may execute firmware (FW). When the memory device 100 is a flash memory device, the memory controller 200 may execute firmware such as a flash translation layer (FTL) for data processing between the host 300 and the memory device 100.

The memory controller 200 may control the memory device 100 to execute the program operation, the read operation, or the erase operation according to a request of the host 300. During the program operation, the memory controller 200 may provide a write command, a physical block address, and data to the memory device 100. During the read operation, the memory controller 200 may provide a read command and the physical block address to the memory device 100. During the erase operation, the memory controller 200 may provide an erase command and the physical block address to the memory device 100.

The memory controller 200 may generate a command, an address, and data of its own accord regardless of the request of the host 300 and transmit them to the memory device 100. For example, the memory controller 200 may provide a command, an address, and data to the memory device 100 in order to perform background operations such as a program operation for wear leveling and a program operation for garbage collection.

Figure 2:
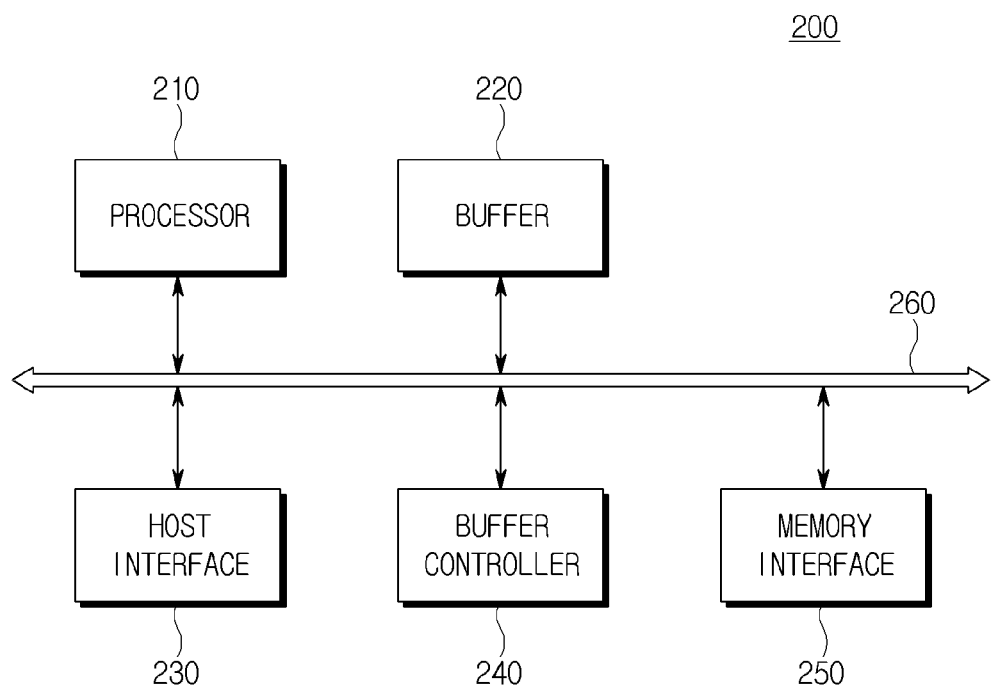
FIG. 2 shows an example configuration of the memory system based on some embodiments of the disclosed technology.

FIG. 2 shows an example configuration of the memory controller 200 based on some embodiments of the disclosed technology.

Referring to FIG. 2, the memory controller 200 may include a processor 210, a buffer memory (or buffer) 220, a host interface 230, a buffer controller 240, and a memory interface 250. Although FIG. 2 shows respective components of the memory controller 200 are connected through a bus 260 and transmit data to each other, the disclosed technology is not limited thereto. According to another embodiment, respective components may be connected through a serial interface or a parallel interface and may perform one-to-one data transmission.

The processor 210 may control all operations of the memory controller 200 and may perform logical operations. The processor 210 may communicate with the external host 300 through the host interface 230 and may communicate with the memory device 100 through the memory interface 250. Also, the processor 210 may communicate with the buffer 220 through the buffer controller 240. The processor 210 may control the operation of the memory system by using the buffer 220 as an operation memory, a cache memory, or a temporary buffer.

The processor 210 may perform a function of a flash translation layer. The processor 210 may convert a logical block address (LBA) provided by the host 300 into a physical block address (PBA) through the flash translation layer or based on mapping information in the flash translation layer. The flash translation layer may convert the logical block address (LBA) provided by the host 300 into the physical block address (PBA) corresponding to the logical block address LBA by using a mapping table such as the L2P map.

The buffer 220 may be used as an operating memory, a cache memory, or a buffer memory of the processor 210. The buffer 220 may store codes and commands executed by the processor 210. The buffer 220 may temporarily store data processed by the processor 210. The buffer 220 may include a static RAM (SRAM) or a dynamic RAM (DRAM).

In some implementations, the buffer memory (or buffer) 220 may be used to store an L2P map. In one example, the buffer memory (or buffer) 220 may be used to store a first L2P and a second L2P map as will be discussed below with reference to FIG. 5.

The host interface 230 may be configured to communicate with an external host under the control of the processor 210. The host interface 230 may be configured to communicate with the host 300 by using at least one of various interface methods such as a USB, a serial AT attachment (SATA), a serial attached SCSI (SAS), a high speed interchip (HSIC), a small computer system interface (SCSI), a peripheral component interconnection (PCI), PCI express (PCIe), non-volatile memory express (NVMe), a universal flash storage (UFS), SD, MMC, eMMC, a dual in-line memory module (DIMM), a registered DIMM (RDIMM), a Load Reduced DIMM (LRDIMM), etc.

The buffer controller 240 may be configured to control the buffer 220 under the control of the processor 210.

The memory interface 250 may be configured to communicate with the memory device 100 under the control of the processor 210. The memory interface 250 may provide a control signal, an address, and/or data to the memory device 100, and may receive data from the memory device 100 based on one or more interface protocols supported by the memory device 100.

In some embodiments of the disclosed technology, in the case of the memory system having a DRAM-less structure, the memory controller 200 may include an SRAM that can be used as a cache or a temporary memory within the processor 210 or separately. However, the memory controller 200 may not include the buffer controller 240 and the buffer 220 for temporarily storing data to be stored in memory device 100 or data read from the memory device 100.

In some embodiments of the disclosed technology, the processor 210 may control the operation of the memory controller 200 by using program codes in which the functions of the flash translation layer are implemented. When power is applied, the processor 210 may read and execute corresponding codes from a non-volatile memory device (e.g., a read only memory) in the memory controller 200. In another embodiment, the processor 210 may read and execute program codes in which the function of the flash translation layer is implemented from the memory device 100 through the memory interface 250. Even in this case, the minimum firmware code for executing the memory interface 250 may be read from the non-volatile memory device in the memory controller 200.

In some embodiments of the disclosed technology, the bus 260 of the memory controller 200 may be divided into a control bus and a data bus. The data bus may be configured to transmit data within the memory controller 200, and the control bus may be configured to transmit control information such as commands and addresses within the memory controller 200. The data bus and control bus are separated from each other and may not interfere with or affect each other. The data bus may be connected to and/or in communication with the host interface 230, the buffer controller 240, and the memory interface 250. The control bus may be connected to and/or in communication with the host interface 230, the processor 210, the buffer controller 240, the buffer 220, and the memory interface 250.

In some embodiments, when data is transmitted between the respective components of the memory controller 200 by using a serial interface, the control information, such as commands and addresses, and the data can be transmitted in accordance with a frame format designed specifically through two to three conductive lines or interconnects that can carry electrical signals.

A core function of the memory controller 200 shown in FIG. 2 may be to receive the data and the logical block address (LBA) from the host 300 and to convert the logical block address into the physical block address (PBA) that indicates addresses of the memory cells in which the data included in the memory device 100 is to be stored. To this end, the memory controller 200 may generate and store the L2P map including mapping information between a logical address and a physical address. The L2P map may include mapping information arranged based on the logical address since it is easy to find the physical address based on the logical address.

In some embodiments of the disclosed technology, the L2P map is written to the memory device 100 to retain the mapping information even if power supply to the memory system 1000 is disrupted.

When power is applied to the memory system 1000 or data written to the memory device 100 is to be read, the memory controller 200 may read and use the L2P map from the memory device 100. Here, the memory controller 200 may read the entire L2P map and store it in the buffer 220, or may read only a portion of the L2P map and store it in the buffer 220. When only a portion of the L2P map is written to the buffer 220 or a cache memory, or when there is a request for a logical address block that is not written to the buffer 220 or to the cache memory from the host 300, the memory controller 200 may read the rest of the L2P map from the memory device 100 again.

The memory controller 200 causes the L2P map that is updated in the buffer 220 in real time to be written to the memory device 100 periodically or at a point in time when power is normally turned off, thereby preventing loss of important mapping information.

In some embodiments of the disclosed technology, the memory controller 200 may additionally generate and store a Physical to Logical (P2L) map. The P2L map may include mapping information arranged based on the physical address because it is easy to find the logical address based on the physical address. The P2L map may be written to the buffer 220, and when power is not applied to the memory system 1000, all information in the P2L map may be lost. Accordingly, when the power of the memory system 1000 is normally turned off, the memory controller 200 may update the L2P map based on the P2L map and then turn off the power before the power is completely turned off.

Figure 3:
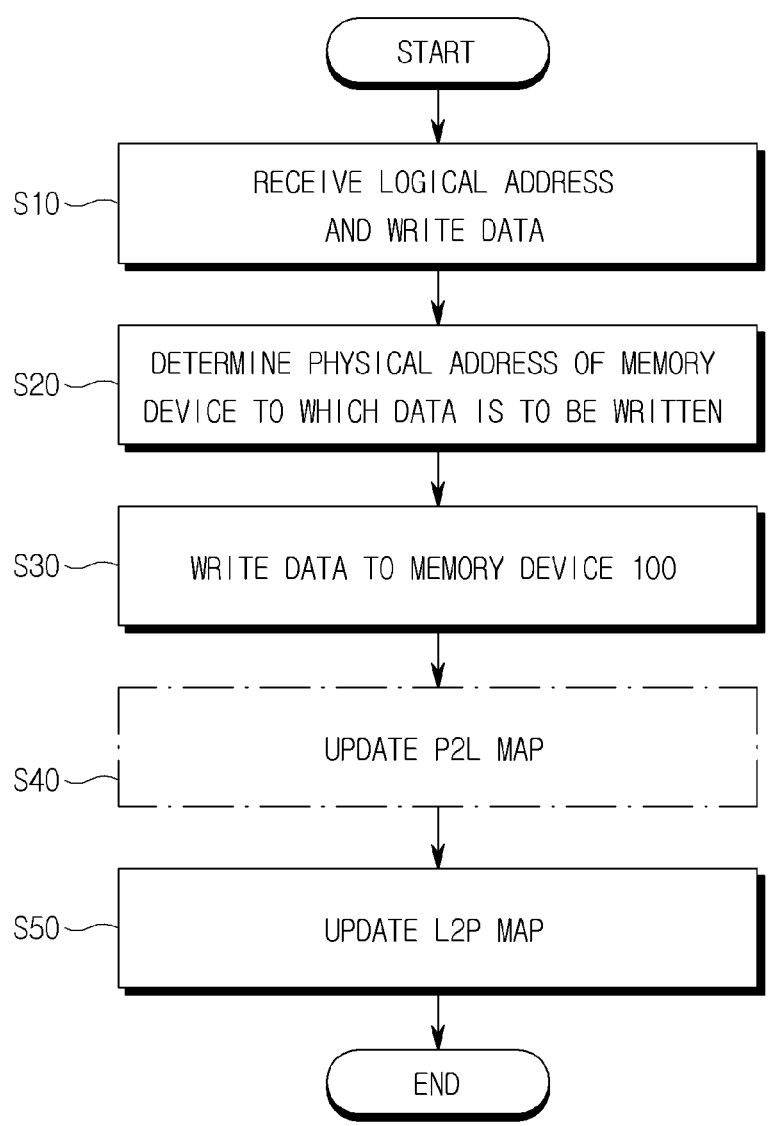
FIG. 3 is a flowchart showing an operation by the memory controller to write data to a memory device based on some embodiments of the disclosed technology.

FIG. 3 is a flowchart showing an operation by the memory controller 200 to write data to a memory device 100 based on some embodiments of the disclosed technology.

Referring to FIG. 3, at S10, the memory controller 200 may receive a control data including a write command and logical address and may receive a write data to be written to the logical address, from the host 300. In some embodiments of the disclosed technology, the memory controller 200 may temporarily store the received data in the buffer 220 and may generate control signals required for writing the data to the memory device 100.

At S20, the memory controller 200 may determine a physical address of the memory device 100 to which data is to be written. The memory controller 200 may determine an address of a free memory block or an open memory block on which an erase operation has been performed in an area of the memory device 100 as a physical address to which data is to be written. In some embodiments of the disclosed technology, the memory controller 200 may store, in the buffer 220, an address list of the open memory blocks on which the erase operation has been performed, and may select one of them to determine that it is a physical address to which data is to be written. In some embodiments, when data is written to only some pages of the open memory block, the memory controller 200 may determine that an address of a page to which no data is written in the corresponding open memory block is a physical address.

At S30, the memory controller 200 may write (program) the received write data to the determined physical address of the memory device 100. To this end, the memory controller 200 may generate a control signal required for the memory device 100 to perform a writing operation and may transmit the control signal to the memory device 100.

At S50, the memory controller 200 may update the L2P map. The memory controller 200 may map the logical address received from the host 300 at S10 and the physical address of the memory device 100 to which the data determined at S20 is to be written to each other, and may write them to the L2P map. Here, the memory controller 200 can update in real time the L2P map residing in the buffer 220. However, the memory controller 200 can update the L2P map residing in the memory device 100, periodically or at a point in time when power is turned off. That is, the minimum unit of writing to or reading from the memory device 100 is a page, and since writing data to the memory device 100 requires more power and time than reading data from the memory device 100, it may be inefficient to update in real time the L2P map residing in the memory device 100. Accordingly, the L2P map residing in the buffer 220 is updated in real time, and the L2P map residing in the memory device 100 is periodically updated, so that efficiency can be improved.

In some embodiments of the disclosed technology, when the memory controller 200 includes additional P2L maps, the memory controller 200 may update the P2L map at S40. The memory controller 200 may map the logical address received from the host 300 at S10 and the physical address of the memory device 100 to which the data determined at S20 is to be written to each other, and may write them to the P2L map. In some embodiments of the disclosed technology, the P2L map may be stored in the buffer 220.

At S50, the memory controller 200 may update the L2P map based on P2L map information. That is, the memory controller 200 may write a mapping relationship between the logical address and the physical address newly updated in the P2L map to the L2P map based on the logical address.

In some embodiments of the disclosed technology, the memory controller 200 may perform operations corresponding to S30 and S50 in parallel, or may perform operations corresponding to S50 before performing the operation corresponding to S30.

Figure 4:
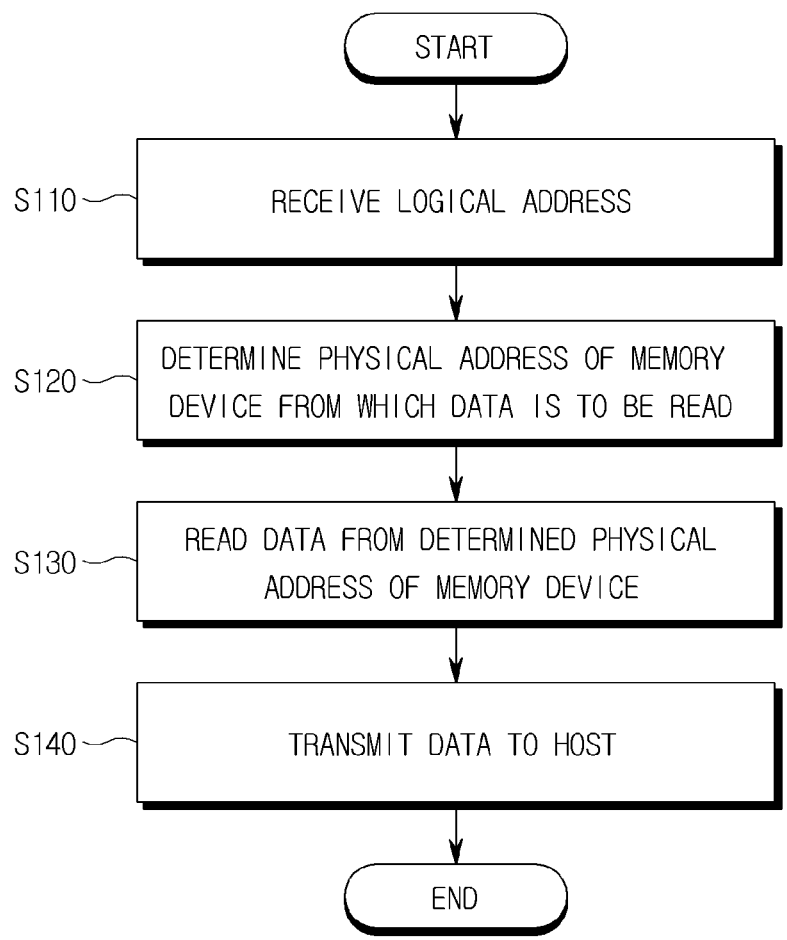
FIG. 4 is a flowchart showing an operation by the memory controller to read data from a memory device based on some embodiments of the disclosed technology.

FIG. 4 is a flowchart showing an operation by the memory controller 200 to read data from a memory device 100 based on some embodiments of the disclosed technology.

Referring to FIG. 4, at S110, the memory controller 200 may receive a control data including a read command and logical address from the host 300. In some embodiments of the disclosed technology, the memory controller 200 may generate control signals required for reading data from the memory device 100, based on the received control data.

At S120, the memory controller 200 may determine a physical address of the memory device 100 from which data is to be read. In some embodiments of the disclosed technology, the memory controller 200 may determine a physical address from which data is to be read through L2P map search.

When the entire L2P map resides in the buffer 220, the memory controller 200 may determine the physical address of the memory device 100 from which data is to be read directly from the L2P map.

In some embodiments, the L2P map may include a plurality of L2P map segments, and only some L2P map segments instead of the entire L2P map may reside in the buffer 220. In this situation, when the L2P map segment including the received logical address does not reside in the buffer 220, the memory controller 200 may read the L2P map segment including the corresponding logical address from the memory device 100 and may store it in the buffer 220 or in the cache memory, and may determine a physical address corresponding to the logical address.

At S130, the memory controller 200 may read data from the determined physical address of the memory device 100 and may transmit the read data to the host 300 through the host interface 230 at S140. In some embodiments of the disclosed technology, the memory controller 200 may temporarily store, in the buffer 220, the data read from the memory device 100 and then may transmit the data to the host 300. Alternatively, according to another embodiment, the memory controller 200 may transmit directly the data read from the memory device 100 to the host 300.

In some implementations, when the operations corresponding to S10-S50 in FIG. 3 are performed, an area of the memory device 100 where writing is performed by an administrator account and an area of the memory device 100 where writing is performed by a user account are not distinguished. Therefore, there is a possibility that the data in the area used by a system account may be changed by an error in the host 300 system or wrong access of the user. That is, it may be difficult to protect the system because the memory system 1000 does not include a function that enables system protection through access prohibition.

In some implementations, the area of the memory device 100 can be physically divided into an administrator account area and a user account area. However, in this case, while the administrator account can use the entire area of the memory device 100, the user account can use only the user account area. Accordingly, usability may be limited and the memory system 1000 may be difficult to utilize.

In order to address such issues, the disclosed technology can be implemented in some embodiments to provide a method of using a double-map scheme instead of physically dividing the area of the memory device 100.

Figure 5:
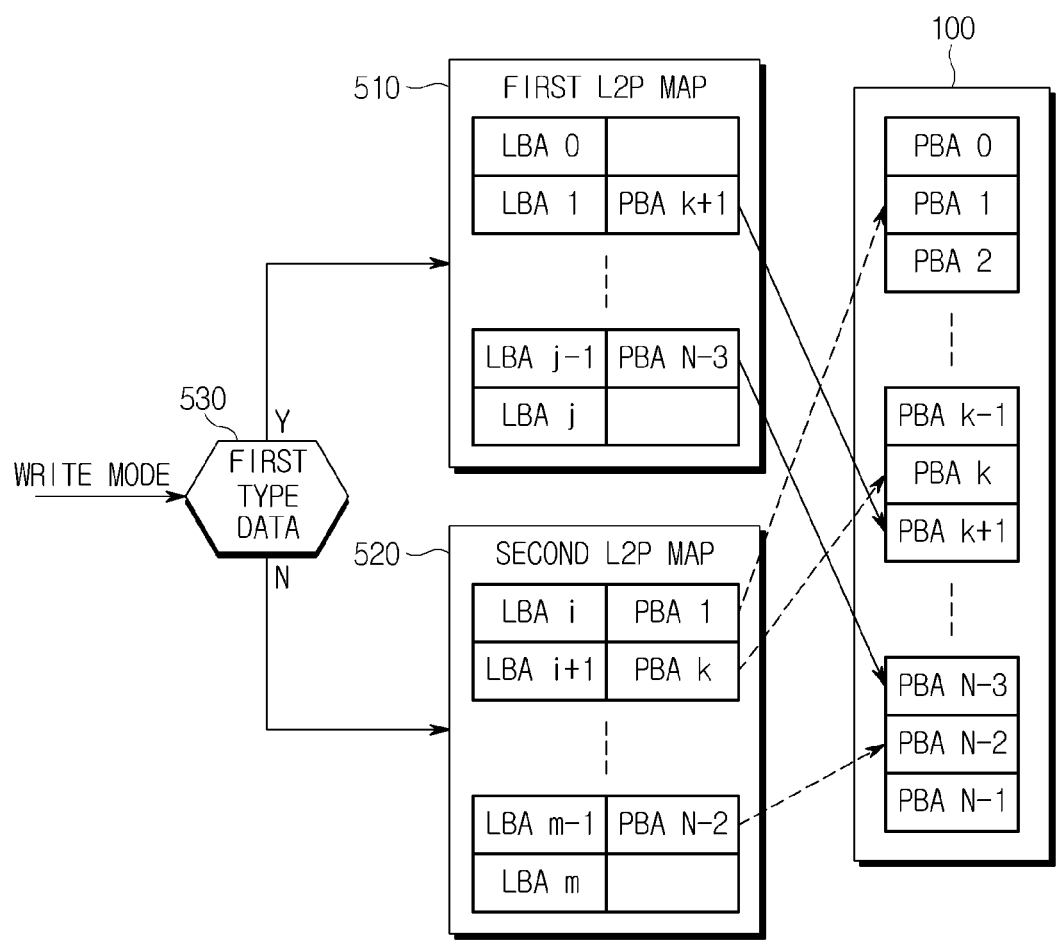
FIG. 5 shows an example operation of the memory controller that uses a double-map scheme based on some embodiments of the disclosed technology.

FIG. 5 shows an example operation of the memory controller that uses a double-map scheme based on some embodiments of the disclosed technology. In some implementations, the double-map scheme may include any type of mapping scheme that uses two or more maps.

In some embodiments of the disclosed technology, the L2P map may include a first L2P map 510 and a second L2P map 520. The first L2P map 510 includes mapping information on the memory which is used by the administrator account. The first L2P map 510 can maintain the information as it is even when the power is turned off or the system or device is reset, so that the mapping information between the logical address of the host 300 and the physical address corresponding the logical address can be maintained as it is after the power is turned on or the system or device is reset. On the other hand, the second L2P map 520 is a temporary map and may include mapping information on data that is temporarily stored by the user account or the administrator account. When the power is turned off or the system or device is reset, the second L2P map 520 may lose all related information. Accordingly, while the first L2P map 510 should be stored in the memory device 100 that maintains contents even when power is not applied, the second L2P map 520 may be stored in the memory device 100 or may be stored in the buffer 220 where the contents are deleted when power is not applied.

Also, when power is applied, the memory controller 200 may read the first L2P map 510 written to a preset area of the memory device 100 and may store it in a specific area of the buffer 220. In addition, when power is applied, the memory controller 200 may allocate an area for storing the second L2P map 520 to the buffer 220. In some embodiments of the disclosed technology, even if writing to the second L2P map 520 is in the memory device 100, the corresponding writing does not need to be read.

The memory controller 200 may update the first L2P map 510 and the second L2P map 520 in the buffer 220 in real time. In some embodiments of the disclosed technology, when receiving a data storage request from the host 300, the memory controller 200 determines whether a write mode indicates writing "first-type data" or "second-type data" among the control data received from the host 300. If the write mode indicates writing the "first-type data," the memory controller 200 may write the data to the memory device 100 and update the first L2P map 510. If the write mode indicates writing the "second-type data," the memory controller 200 may write the data to the memory device 100 and update the second L2P map 520. Here, the memory controller 200 may determine the physical address of the memory device 100 without distinguishing whether the data to be written is "first-type data" or "second-type data." That is, the memory device 100 can write the "first-type data" and the "second-type data" by using any writable physical address without dividing an area in the memory device 100 where the "first-type data" is to be stored and an area in the memory device 100 where the "second-type data" is to be stored.

In some embodiments of the disclosed technology, it may be common for the host 300 to use logical addresses of different areas as the logical address of the "first-type data" and the logical address of the "second-type data." However, in some embodiments, the host 300 may use the same logical address as a logical address for the "first-type data" and as a logical address for the "second-type data." In this case, the memory controller 200 may receive, from the host 300, a data storage request having different write modes for the same logical address. For example, the memory controller 200 may receive a data storage request of which the write mode is "first-type data" and a data storage request of which the write mode is "second-type data" with respect to the logical address "A." In some implementations, data storage requests may be received at different timings. In response to these two requests, the memory controller 200 may determine different physical addresses of the memory device 100 to which data is to be written and may store the data. Here, the data storage request of which the write mode is "first-type data" may update the first L2P map 510, and the data storage request of which the write mode is "second-type data" may update the second L2P map 520. Accordingly, the first L2P map 510 and the second L2P map 520 may include information that different physical addresses are mapped to the same logical address.

The memory controller 200 may periodically store the first L2P map 510 in the memory device 100 in order to prepare for a sudden power off.

Figure 6:
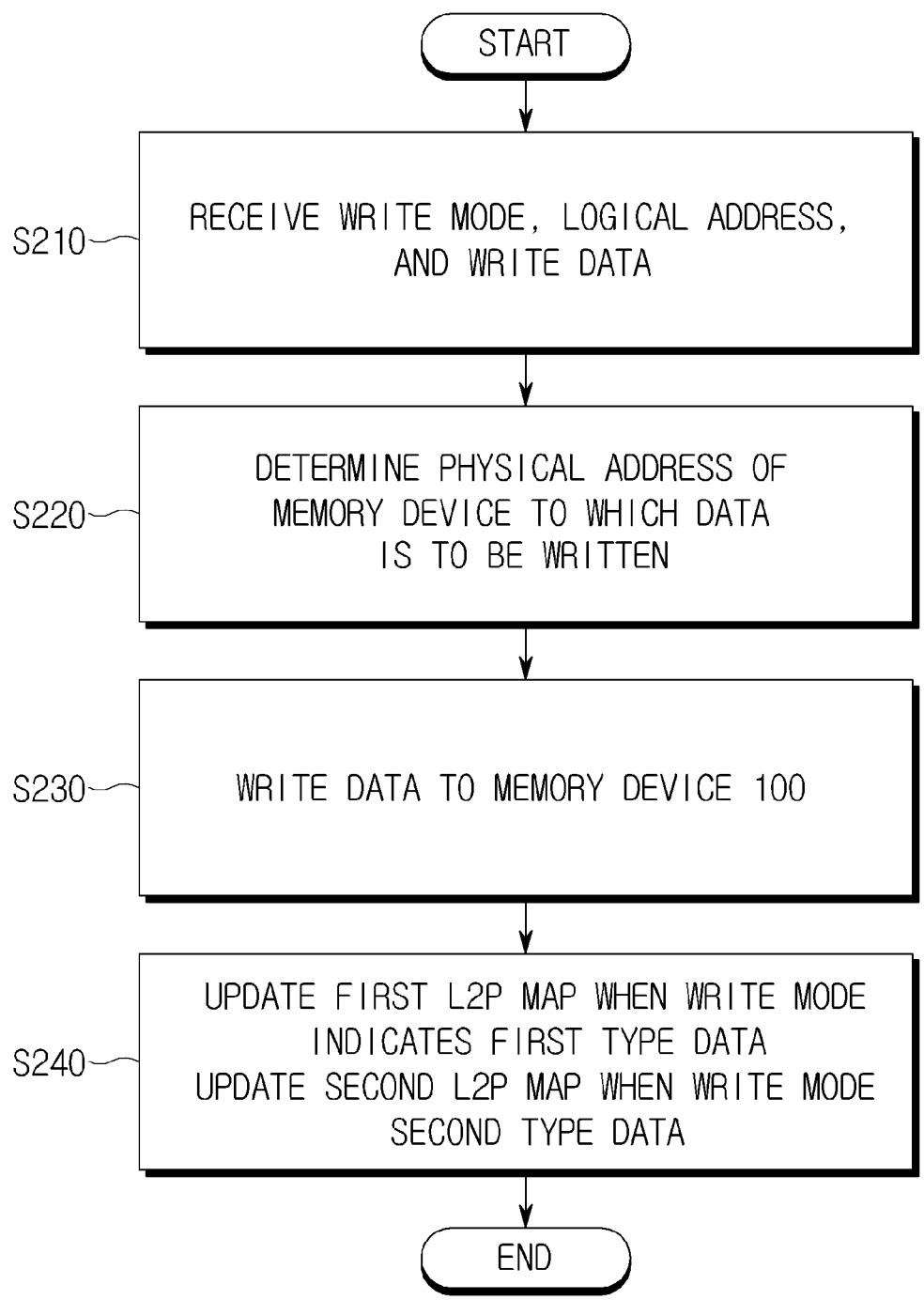
FIG. 6 is a flowchart showing an example of data writing operation by the memory controller configured to use the double-map scheme based on some embodiments of the disclosed technology.

FIG. 6 is a flowchart showing an example of data writing operation by the memory controller 200 configured to use the double-map scheme based on some embodiments of the disclosed technology.

Referring to FIG. 6, at S210, the memory controller 200 may receive, from the host 300, control data including a write command, a write mode, and a logical address, and write data to be written to the logical address. In some embodiments of the disclosed technology, the memory controller 200 may temporarily store the received data in the buffer 220 and may generate control signals required for writing the data to the memory device 100. Here, the write mode may indicate whether the data to be written is the first-type data (important data) that should be maintained even while the power is turned off or the reset is performed or the second-type data (temporary data) that is deleted while the power is turned off or the reset is performed.

In some embodiments of the disclosed technology, when the administrator account of the host 300 intends to write data to the memory system 1000, the write mode is indicated as the first-type data, and when the user account intends to write data to the memory system 1000, the write mode is indicated as the second-type data. However, this is not necessarily limited to this use case. According to another embodiment, the user may indicate whether the data to be written to the memory device 100 is the first-type data or the second-type data and may provide it to the host 300. The host 300 may set the write mode based on the information provision of the user and may transmit it to the memory system 1000.

At S220, the memory controller 200 may determine a physical address of the memory device 100 to which data is to be written. The memory controller 200 may determine an address of a free memory block or an open memory block on which an erase operation has been performed in an area of the memory device 100 as a physical address to which data is to be written. In some embodiments of the disclosed technology, the memory controller 200 may store, in the buffer 220, an address list of the open memory blocks on which the erase operation has been performed, and may select some of them to determine that it is a physical address to which data is to be written. In some embodiments, when data is written to only some pages of the open memory block, the memory controller 200 may determine that an address of a page to which no data is written in the corresponding open memory block is a physical address. Here, the determined physical address may be selected in the same way regardless of whether the data to be written is the first-type data or the second-type data. Therefore, unlike that some areas of the memory device 100 are used as a first-type data area and the remaining areas are used as a second-type data area, the memory device is used without distinction of the first-type data area and the second-type data area, so that the efficiency of the memory use can be improved.

At S230, the memory controller 200 may write (program) the received write data to the determined physical address of the memory device 100. In some embodiments of the disclosed technology, the memory controller 200 may set a flag indicating whether data currently being written to a spare area for storing metadata, etc., of the memory device 100 is the first-type data or the second-type data, and may proceed with a writing operation. This flag may be used to determine whether data should be written again after the memory controller 200 recovers from a sudden power off, if the writing of the data was in progress when there was the sudden power off. In some embodiments of the disclosed technology, when the set flag indicates the first-type data, the memory controller 200 writes again the data, the writing of which was in progress when there was a sudden power off, after recovering from the sudden power off, and when the set flag indicates the second-type data, after recovering from the sudden power off, the memory controller 200 may not need to write again the data, the writing of which was in progress when there was a sudden power off, after recovering from the sudden power off.

At S240, the memory controller 200 may update the first L2P map or the second L2P map based on the write mode.

In some embodiments of the disclosed technology, when the write mode indicates that the first-type data is written, mapping information between the logical block address and the physical block address may be stored in the first L2P map. When the write mode indicates that the second-type data is written, the mapping information between the logical block address and the physical block address may be stored in the second L2P map.

In some embodiments of the disclosed technology, the memory controller 200 may read from the memory device 100 and may update the first L2P map or the second L2P map stored in the buffer 220. In addition, the memory controller 200 may write the first L2P map to the memory device 100 periodically or when the power is turned off.

In some embodiments of the disclosed technology, the memory controller 200 may perform operations corresponding to S230 and S240 in parallel, or may perform the operation corresponding to S240 before performing the operation corresponding to S230.

The read operation of the memory controller 200 shown in FIG. 4 may be used in the same manner even when a double-map scheme is used.

In some embodiments of the disclosed technology, erroneous data may be written to a logical address where important data has been written due to a user's mistake or a malfunction of the host 300. For example, in a situation where important data is written to the logical block address LBA1 and the physical block address PBA k+1 mapped to the logical block address LBA1, when receiving a request to store temporary data in the logical address LBA1 from the host 300, the memory controller 200 will map a new physical address (e.g., PBA2) to the LBA1, and write the temporary data to the corresponding physical address. Then, a physical address PBA k+1 may be mapped to the first L2P map corresponding to the logical address LBA1, and a physical address PBA2 may be mapped to the second L2P map corresponding to the logical address LBA1. Then, when the host 300 requests data read of the logical address LBA1, the temporary data written to the physical address PBA2 may be transmitted to the host 300. Then, there is a possibility that the host 300 may malfunction, and the user may turn off the power in response to the malfunction of the host 300. When the power is turned off or the device or system is reset, the first L2P map information can be maintained as it is while all of the second L2P map information may be lost. Accordingly, the host 300 can restore original important data through power reset and operate normally.

In some embodiments of the disclosed technology, the memory system itself provides a protection area and a non-protection area, thereby increasing the efficiency of data management.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Only a few implementations and examples are described and other implementations, enhancements and variations can be made based on what is described and illustrated in this patent document.

What is claimed is:

1. A memory controller comprising:
a first interface in communication with a first external device to perform data communication between the memory controller and the first external device;
a second interface in communication with a second external device to transmit, to the second external device, a signal for controlling an operation of the second external device;
a buffer configured to store: a first map comprising mapping information between a logical address of the first external device for storing first data which is a first type data and a physical address of the second external device where the first data is stored; and a second map comprising mapping information between a logical address of the first external device for storing second data which is a second-type data and a physical address of the second external device where the second data is stored; and
a processor configured to update the first map and the second map based on a control signal received from the first external device, and store the first map in the second external device,
wherein the first map maintains the mapping information even after a reset operation is performed, and
wherein the second map loses the mapping information after the reset operation is performed.

2. The memory controller of claim 1, wherein the processor is further configured to:
receive, from the first external device, a write request comprising a first logical address, write data, and a write mode indicating whether the write data is the first-type data or the second-type data;
determine a first physical address of the second external device, to which the write data is to be written; and
write mapping information between the first logical address and the first physical address to the first map or the second map, based on the write mode.

3. The memory controller of claim 2, wherein the processor is configured to:
write, based on the write mode, information indicating whether the write data is the first-type data or the second-type data to a specific area of the second external device and
write the write data to memory cell corresponding to the first physical address of the second external device.

4. The memory controller of claim 1,
wherein the first-type data is maintained in the second external device even when power supply is disrupted, and
wherein the second-type data is not maintained when power supply is disrupted.

5. The memory controller of claim 1, wherein the processor is configured to:
receive, from the first external device, a read request comprising a second logical address and a write mode;
determine a second physical address of the second external device from which data is to be read from the first map or the second map, based on the write mode; and
control the second interface to transmit a control signal for reading data from the second physical address of the second external device.

6. An operation method for operating a memory controller, comprising:
receiving, from a first external device, a write request comprising a first logical address, write data, and a write mode indicating whether the write data is first-type data or second-type data;
determining a first physical address of a second external device, to which the write data is to be written; and
writing mapping information between the first logical address and the first physical address to a first map or a second map, based on the write mode,
wherein the first map comprises mapping information between a logical address of the first external device for storing first data which is a first-type data and a physical address of the second external device where the first-type data is stored, and maintains the mapping information even after a reset operation is performed,
wherein the second map comprises mapping information between a logical address of the first external device for storing second data which is a second-type data and a physical address of the second external device where the second data is stored, and loses the mapping information after the reset operation is performed.

7. The operation method of claim 6,
wherein the first map and the second map are stored in a buffer provided in the memory controller and including a volatile memory, and
wherein the operation method further comprises periodically storing the first map in the second external device.

8. The operation method of claim 6, further comprising:
writing the write data to a memory cell corresponding to the first physical address of the second external device.

9. The operation method of claim 8, wherein the writing of the write data to a memory cell corresponding to the first physical address of the second external device further comprises:
writing, based on the write mode, information indicating whether the write data is the first-type data or the second-type data to a specific area of the second external device; and
writing the write data to a memory cell corresponding to the first physical address of the second external device.

10. The operation method of claim 6,
wherein the first-type data is maintained in the second external device even when power supply to the memory controller is disrupted, and
wherein the second-type data is not maintained when power supply to the memory controller is disrupted.

11. The operation method of claim 6, further comprising:
receiving, from the first external device, a read request comprising a second logical address and a write mode;
determining a second physical address of the second external device from which data is to be read from the first map or the second map, based on the write mode; and
reading data from the second physical address of the second external device.

12. A memory system comprising:
a memory device including a nonvolatile memory and configured to store data in the nonvolatile memory; and
a memory controller configured to generate a control signal for controlling the memory device, write data to the memory device and read data from the memory device,
wherein the memory controller comprises:
a first interface in communication with a first external device to perform data communication between the memory controller and the first external device;
a second interface in communication with a second external device to transmit, to the second external device, a signal for controlling an operation of the second external device;
a buffer configured to store: a first map comprising mapping information between a logical address of the first external device for storing first data which is a first-type data and a physical address of the memory device where the first data is stored; and a second map comprising mapping information between a logical address of the first external device for storing second data which is a second-type data and a physical address of the memory device where the second data is stored; and
a processor configured to update the first map and the second map based on a control signal received from the first external device, and periodically store the first map in the memory device,
wherein the first map maintains the mapping information even after a reset operation is performed, and
wherein the second map loses the mapping information after the reset operation is performed.

13. The memory system of claim 12, wherein the memory controller is further configured to:
receive, from the first external device, a write request comprising a first logical address, write data, and a write mode indicating whether the write data is the first-type data or the second-type data;
determine a first physical address of the second external device, to which the write data is to be written;
write mapping information between the first logical address and the first physical address to the first map or the second map, based on the write mode; and
write the write data to the first physical address of the memory device.

14. The memory system of claim 12, wherein the memory controller is configured to:
receive, from the first external device, a read request comprising a second logical address and a write mode;

determine a second physical address of the memory device from which data is to be read from the first map or the second map, based on the write mode; and read data from the second physical address of the memory device.

* * * * *